UNITED STATES PATENT OFFICE.

HORACE BILLINGS, OF BEARDSTOWN, ILLINOIS.

COMPOSITION FOR COVERING HAMS.

Specification forming part of Letters Patent No. 7,256, dated April 9, 1850.

*To all whom it may concern:*

Be it known that I, HORACE BILLINGS, of Beardstown, in the county of Cass and State of Illinois, have invented a new and Improved Composition for Coating Bacon, Hams, or other kinds of Meats, or for covering fruits, vegetables, &c., for the purpose of preserving them by the total exclusion of moisture and all atmospheric influences; and I do hereby declare the following to be a full and exact description thereof, to wit:

Place fifty pounds of good rosin and twenty pounds of shellac in a suitable vessel and raise the temperature to such a degree that they can be thoroughly incorporated with each other. Then add thereto six quarts of boiled linseed-oil and keep up the temperature and continue the agitation of the mass until all signs of evaporation shall have ceased, when the composition will present a bright frothy appearance and will be ready for use.

For preserving hams or other meats they should be first covered with paper and canvas, or any other suitable preparatory covering, secured in any usual or well-known manner, and then be immersed into the above-described preserving composition while it is in a melted state, and immediately removed therefrom and hung up to dry. In a very few minutes after thus coating meats or fruits or vegetables they will be in a proper state for packing down into casks or boxes for shipment. Fruits or vegetables should also be covered with some suitable flexible material before dipping them into the preserving composition. The coating produced upon the surface of articles by dipping them into my improved preserving composition is so tough and elastic as not to be injured by handling them, and is perfectly impervious to moisture.

It is possible that the proportions of the respective ingredients made use of in the formation of my preserving composition may be slightly varied without essential injury, and therefore I do not intend to limit myself to the exact proportions of the said ingredients, as above specified.

I do not intend to claim as my invention the covering of meats or other articles with paper and cloth or other flexible materials previous to coating them with my preserving composition; but What I do claim as my invention, and desire to secure by Letters Patent, is—

The formation of a preserving composition for coating meats, fruits, vegetables, &c., by the union of rosin, shellac, and linseed-oil, substantially in the manner and in nearly the proportions as herein set forth.

HORACE BILLINGS.

Witnesses:
 HART LARRABEE,
 THOS. S. WILES.